(12) United States Patent
Kimura et al.

(10) Patent No.: US 11,100,356 B2
(45) Date of Patent: Aug. 24, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Shunichi Kimura, Kanagawa (JP); Masanori Sekino, Kanagawa (JP); Takuya Sakurai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 179 days.

(21) Appl. No.: 16/518,994

(22) Filed: Jul. 23, 2019

(65) Prior Publication Data
US 2020/0242390 A1    Jul. 30, 2020

(30) Foreign Application Priority Data
Jan. 24, 2019    (JP) .............................. JP2019-010051

(51) Int. Cl.
*G06K 9/46* (2006.01)
*G06K 9/62* (2006.01)

(52) U.S. Cl.
CPC ............. *G06K 9/46* (2013.01); *G06K 9/6201* (2013.01); *G06K 2209/01* (2013.01)

(58) Field of Classification Search
CPC .......... G06K 9/033; G06K 9/46; G06K 9/344; G06K 9/346; G06K 9/6201; G06K 2209/01

USPC .......................................................... 382/229
See application file for complete search history.

(56) References Cited

U.S. PATENT DOCUMENTS

| 6,295,387 | B1 * | 9/2001 | Burch .................... G06K 9/033 382/311 |
| 8,620,090 | B2 | 12/2013 | Tanaka |
| 10,095,946 | B2 * | 10/2018 | Vanhall .............. G06K 9/00442 |
| 2004/0114803 | A1 * | 6/2004 | Tuganbaev .............. G06K 9/03 382/186 |

FOREIGN PATENT DOCUMENTS

| JP | 2000082110 | 3/2000 |
| JP | 2012093876 | 5/2012 |
| JP | 2012185713 | 9/2012 |
| JP | 2016212812 | 12/2016 |

* cited by examiner

*Primary Examiner* — Daniel G Mariam
(74) *Attorney, Agent, or Firm* — JCIPRNET

(57) ABSTRACT

An information processing apparatus includes a character recognition section that performs character recognition of an input image to output a character recognition result, a receiving section that receives an input of a character recognition result by a person on the input image, a detection section that detects a strikethrough from the input image, a matching section that matches the character recognition result output by the character recognition section with the character recognition result by the person, which is received by the receiving section, and a control section that performs control for causing the matching section to perform matching so as to obtain a final character recognition result based on a result of the matching, in a case where the detection section detects the strikethrough.

5 Claims, 6 Drawing Sheets

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-010051 filed Jan. 24, 2019.

BACKGROUND

(i) Technical Field

The present invention relates to an information processing apparatus and a non-transitory computer readable medium storing a program.

(ii) Related Art

There is a data input system that digitizes a character string handwritten or printed on a paper business form. In the data input system, the character string in the business form is digitized by a method of causing a person to read the form and input a character string in the form with keys, a method of performing character recognition processing on an image in the form by a character recognizer using an optical character recognition (OCR) technology, and a combination thereof.

In an information processing apparatus disclosed in JP2016-212812A, a classification section classifies a character recognition target into any of three types, an extraction section extracts a character recognition result of the character recognition target in a case where the character recognition target is classified into a first type by the classification section, a first control section performs control to extract the character recognition result of the character recognition target and to manually input the character recognition result, in a case where the character recognition target is classified into a second type by the classification section, and a second control section performs control to cause a plurality of persons to manually input the character recognition target in a case where the character recognition target is classified into a third type by the classification section. JP2016-212812A discloses that a character recognition module outputs certainty (that is, degree of assuring that the character recognition result is correct) of the character recognition result, and thus classifies the character recognition target into the first to third types in accordance with the value of the certainty, and extracts the character recognition result as a final result in a case where the certainty is within the highest range.

A user may strike a handwritten or printed character string through. The character string struck through indicates that the user cancels the character string. Thus, in character recognition processing, even though the character string is recognizable, for example, rejection of the recognition result is desirable. However, depending on a character constituting the character string or a form of the strikethrough drawn on the character, the character recognition module may be capable of recognizing the character string, and thus the certainty of the character recognition result may have a high value. In such a case, there is a possibility that the character recognition result having high certainty is employed as the final result in spite of the strikethrough.

Thus, processing of detecting a strikethrough is performed separately from character recognition, and a character recognition result corresponding to a portion at which the strikethrough is detected is rejected.

For example, in a system disclosed in JP2012-185713A, a rejection determination unit based on the score performs rejection determination of a recognition result based on the value of the reliability of the recognition result obtained by a character pattern recognition unit. A character-frame line contact number detection unit takes out a non-character frame image for one character from an image in the character entry field, and measures the number of character frame lines in contact with the non-character frame image. A ruled-line contact rejection determination unit rejects the recognition result of the character corresponding to the character frame line in a case where the number of character frame lines in contact with the non-character frame image exceeds a predetermined threshold. A rejection process integration unit determines rejection of the character recognition result to be finally output, based on both the result of the rejection determination unit based on the score and the result of the ruled-line contact rejection determination unit.

SUMMARY

In an automatic detection of a strikethrough, for example, scan noise which is not the strikethrough and is included in an input image may be detected as the strikethrough. In a case where the strikethrough is detected from the input image, and a character recognition result of a character recognition section is rejected, the character recognition result is not used in a case where noise in the input image is detected as the strikethrough even though the character recognition section obtains the correct character recognition result.

Aspects of non-limiting embodiments of the present disclosure relate to provide a mechanism for improving probability that a character recognition result of a character recognition section on an input image is to be used in a case where the character recognition result is correct, in a case where, for example, noise which is included in the input image and is not a strikethrough is detected as the strikethrough.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a character recognition section that performs character recognition of an input image to output a character recognition result, a receiving section that receives an input of a character recognition result by a person on the input image, a detection section that detects a strikethrough from the input image, a matching section that matches the character recognition result output by the character recognition section with the character recognition result from the person, which is received by the receiving section, and a control section that performs control for causing the matching section to perform matching so as to obtain a final character recognition result based on a result of the matching, in a case where the detection section detects the strikethrough.

BRIEF DESCRIPTION OF THE DRAWINGS

Exemplary embodiment(s) of the present invention will be described in detail based on the following figures, wherein.

DETAILED DESCRIPTION

Figure 1:
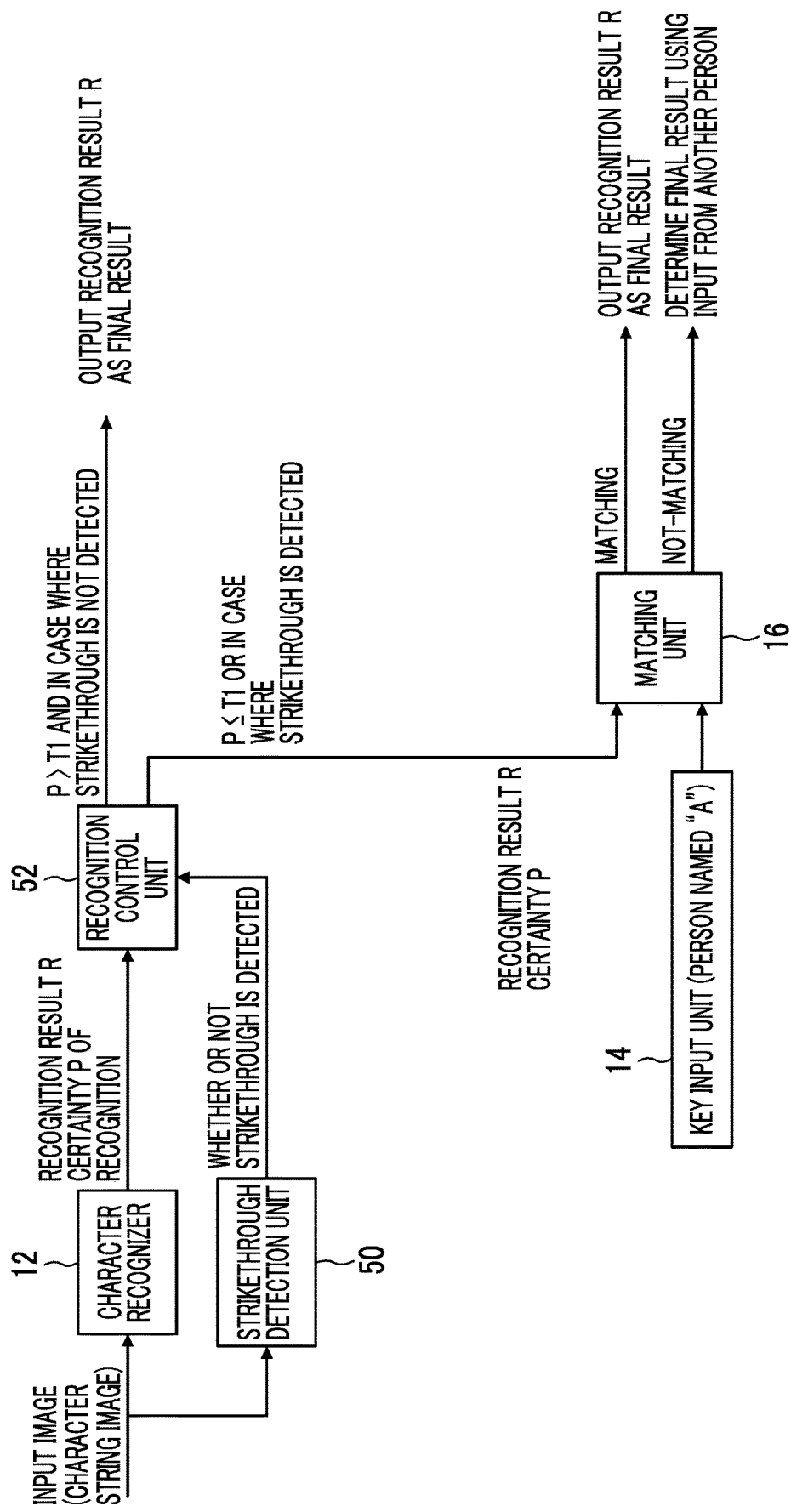
FIG. 1 is a diagram illustrating main components in a configuration of an apparatus according to an exemplary embodiment.

FIG. 1 illustrates a configuration example of an information processing apparatus according to an exemplary embodiment of the present invention.

An input image including an image of a character string is input to the information processing apparatus. The input image is, for example, an image obtained by scanning paper such as a form with a scanner. Alternatively, an image of a region (for example, a specific entry field) including a character string as a recognition target is cutout from an image obtained by scanning paper, and is input to the information processing apparatus as an input image. The character string included in the input image may be a character string constituting a handwritten character, may be a character string of printed types, or may be a character string in which the handwritten character and the printed types are mixed. The character string refers to a string of one or more characters. The character as a target of recognition may include various alphabets, phonograms such as kana, ideograms such as kanji, and various marks such as logos.

The character recognizer 12 performs character recognition on the input image, and obtains and outputs a recognition result R of a character string included in the input image. The recognition result R to be output is a string of character codes of characters constituting the character string. The character recognizer 12 is an example of "a character recognition section".

The character recognizer 12 outputs certainty P of character recognition for the recognition result R. The certainty P is a degree indicating indubitability that the recognition result R obtained by the character recognizer 12 correctly represents the character string included in the input image. As the certainty P increases, the probability that the character code of the recognition result R is correct (that is, the character string in the input image is correctly represented) increases. The recognition result R and the certainty P output by the character recognizer 12 are input to a recognition control unit 52.

A strikethrough detection unit 50 detects a strikethrough from the input image. The strikethrough detection unit 50 is an example of "a detection section".

Figure 2A:
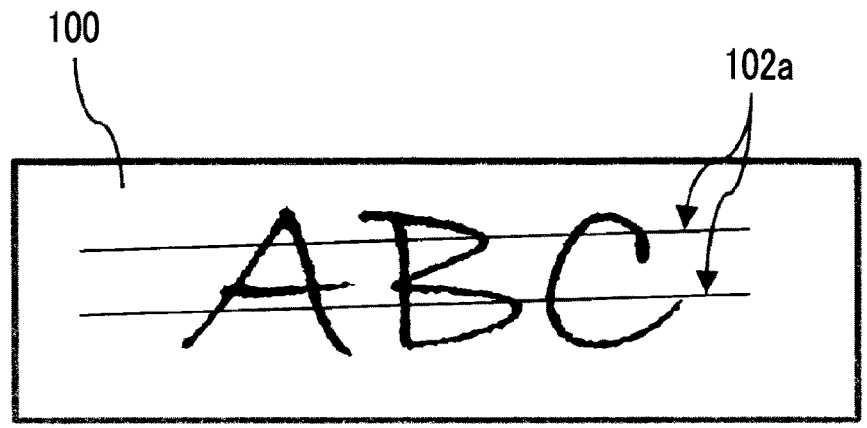
FIGS. 2A to 2C are diagrams illustrating various patterns of a strikethrough.
Figure 2B:
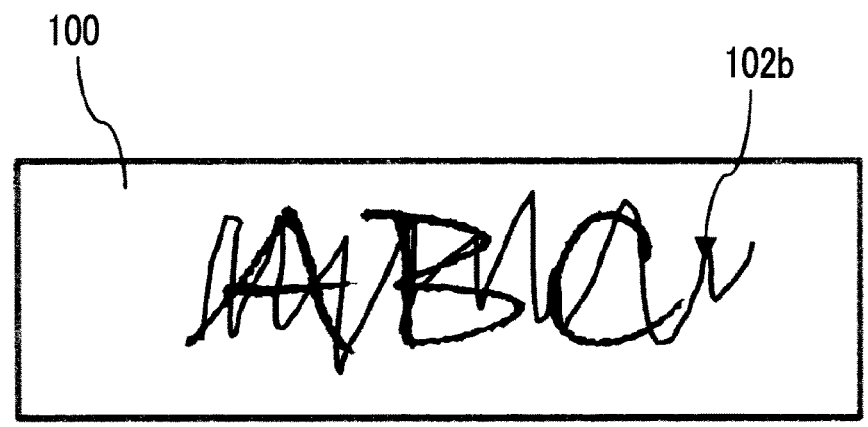
Figure 2C:
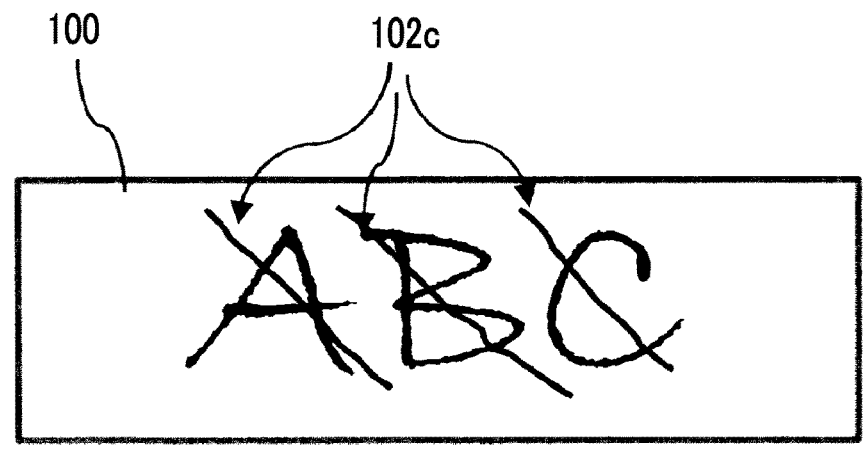

The strikethrough refers to one or a plurality of lines drawn on a character string by hand or by an application in order to cancel the character string. Various patterns are provided for the strikethrough. For example, FIG. 2A illustrates a strikethrough 102a including by two lines on a substantially straight line which extends over the entire width of a handwritten character string "ABC", in order to cancel the character string in an input image 100. A zigzag handwritten strikethrough 102b may be drawn as illustrated in FIG. 2B, or strikethroughs 102c may be respectively drawn for characters of the character string "ABC" as illustrated in FIG. 2C. The strikethrough detection unit 50 may be capable of detecting all the patterns or may be capable of detecting some of the patterns. As in the example of FIG. 2A or 2C, in a case where density of the strikethrough overlapping the character string is low, and the strikethrough has difficulty in interference in character recognition, the certainty P of the recognition result R of the character string, which is obtained by the character recognizer 12 may have a high value.

Various methods in the related art are proposed for a method of detecting a strikethrough in an image. The strikethrough detection unit 50 may use the methods in the related art. the strikethrough detection unit 50 may use a strikethrough detection method obtained by developing the method in the related art.

Figure 3:
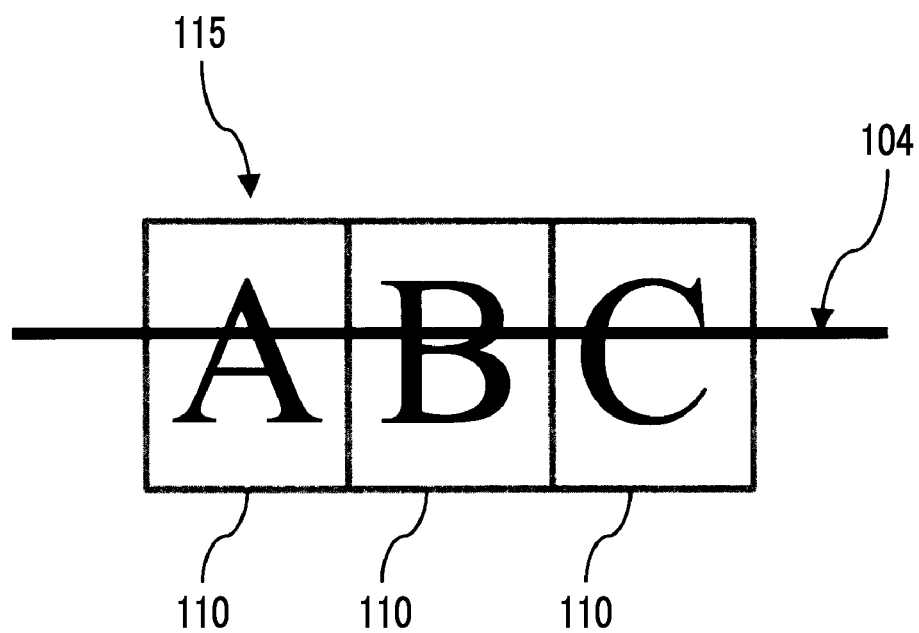
FIG. 3 is a diagram illustrating an example of a strikethrough detection method.

As illustrated in FIG. 3, in a case where an input image obtained by reading a form in which characters are written in an entry frame 115 in which one frame is provided for one character, and one or more unit frames 110 are arranged is a target, and the strikethrough detection unit 50 detects a continuous line segment 104 (which may be a straight line or a curved line) overlapping the two or more unit frames 110, and the strikethrough detection unit 50 may determine the line segments as the strikethrough. The entry frame 115 illustrated in FIG. 3 is a frame of a "ladder frame" type in which the unit frames 110 adjacent to each other are in contact with each other (that is, one side is shared). However, in a case where a space is provided between unit frames 110 adjacent to each other in the entry frame 115, the similar strikethrough detection method may be also applied.

The input image may include reading noise caused by a scanner scanning paper such as a form, a crease on the paper, a linear stain, and the like, as an image. The strikethrough detection unit 50 may detect an image of such noise, a crease, and a stain, as a strikethrough.

The strikethrough detection unit 50 outputs information indicating whether or not a strikethrough is detected from the input image, that is, whether or not the strikethrough is provided in the input image, to the recognition control unit 52.

The recognition control unit 52 controls for obtaining a final character recognition result for the input image, based on the recognition result R and the certainty P output from the character recognizer 12 and the information which is input from the strikethrough detection unit 50 and indicates whether or not the strikethrough is detected. The recognition control unit 52 is an example of "a control section". Control performed by the recognition control unit 52 will be described below.

In the related art, an information processing apparatus that outputs a recognition result R as a final character recognition result of the information processing apparatus in a case where the certainty P of the recognition result R of the character recognizer on an input image is higher than a threshold T1 is provided. In a case where the certainty P is equal to or smaller than the threshold T1, this type of information processing apparatus receives an input of a character recognition result on the same input image from a person and matches the received input with the recognition result R. In this matching, in a case where it is determined that both the recognition results match with (that is, coincide with) each other, the recognition result R is output as the final character recognition result of the information processing apparatus. In this matching, in a case where it is determined that both the recognition results do not match with each other, the information processing apparatus in the related art receives an input of a character recognition result of the same input image from another person and obtains the final character recognition result in consideration of the input character recognition result. In one example, a character recognition result of the first person and a new character recognition result of another person, which is input in this time match with each other. In a case where both the character recognition results coincide with each other, the character recognition result is set as the final character recognition result.

On the contrary, in the exemplary embodiment, even though the certainty P of a recognition result R of the character recognizer 12 on an input image is higher than the threshold T1, the recognition control unit 52 does not set the recognition result R as the final character recognition result of the information processing apparatus only by using a point that the certainty P is higher than the threshold T1. Instead of this, the recognition control unit 52 further uses the information on the input image from the strikethrough detection unit 50 as a reference. Thus, in a case where the certainty P is higher than the threshold T1, and a strikethrough is not provided in the input image, the recognition control unit 52 outputs the recognition result R as the final character recognition result of the information processing apparatus.

In a case where the strikethrough detection unit 50 detects a strikethrough from the input image, the recognition control unit 52 inputs the recognition result R to the matching unit 16 even though the certainty P of the recognition result R of the character recognizer 12 is higher than the threshold T1. The matching unit 16 matches the input recognition result R with a character recognition result on the input image, which is input to a key input unit 14 by a person (in FIG. 1, a person having a name of "A"). The matching unit 16 is an example of "a matching section". The key input unit 14 is a software module that receives a key input from a user (person), and is an example of "a receiving section". A terminal of the person named "A" may be connected to the information processing apparatus illustrated in FIG. 1 via the Internet, for example. In this case, a mechanism of displaying an input image or receiving an input of a recognition result on the input image is provided to the terminal from the key input unit 14 in a form of a web service, for example. The person named "A" recognizes the input image displayed in the terminal and inputs a character string indicated by the input image with a keyboard of the terminal. The key input unit 14 receives character string data input by the person named "A" from the terminal and transfers the character string data to the matching unit 16.

In the related art, a method of rejecting a recognition result of a character recognizer on an input image in a case where a strikethrough is detected from the input image is provided. Differing from such a method, in the exemplary embodiment, even in a case where a strikethrough is detected, a recognition result R of the character recognizer 12 is not rejected, and the recognition result R is reused by being matched with a character recognition result of a person.

In a case where the certainty P of the recognition result R of the character recognizer 12 is equal to or smaller than the threshold T1, similar to the above-described method in the related art, the recognition control unit 52 transfers the recognition result R of the character recognizer 12 to the matching unit 16 and causes the recognition result R to match with a character recognition result by a person.

As described above, in the exemplary embodiment, in a case where a strikethrough is detected, matching of the recognition result R of the character recognizer 12 with the character recognition result by the person is also performed, in addition to a case where the certainty P is equal to or smaller than the threshold T1.

In a case where the recognition result R of the character recognizer 12 matches (that is, coincides) with the character recognition result of the person, which is input to the key input unit 14, the matching unit 16 outputs the recognition result R to the final character recognition result of the information processing apparatus. In a case where the matching result by the matching unit 16 indicates not-matching (that is, not-coincidence), an input of a character recognition result on the input image from a person other than the person named "A" is received, and the final character recognition result of the information processing apparatus is obtained by using the received input. A specific example of processing on a case where the matching result indicates not-matching will be described with reference to FIGS. 4 and 5.

As described above, according to the information processing apparatus illustrated in FIG. 1, in a case where the strikethrough detection unit 50 detects a strikethrough from an input image, a recognition result R of the character recognizer 12 is matched with a character recognition result of a person. There are very many cases in which, even though the strikethrough detection unit 50 erroneously detects an image of reading image included in the input image, a crease of paper, a stain, or the like, as a strikethrough, it is understood that the image is not a strikethrough by human eyes. In such cases, the person recognizes a character string of the input image, which is considered as not being a strikethrough and inputs a recognition result to the key input unit 14. Thus, in a case where the recognition result R of the character recognizer 12 is correct even in a case where an image which is not a strikethrough is erroneously detected from an input image as the strikethrough, the matching unit 16 determines that the recognition result R matches with a character recognition result of a person, and the recognition result R is output as the final recognition result.

In a case where the strikethrough detected by the strikethrough detection unit 50 is really a strikethrough, the person named "A" recognizes the strikethrough and performs a predetermined input (for example, input such as a confirmation with blank) indicating that the strikethrough is provided, to the key input unit 14. Since the value of such an input is different from the value of the recognition result R of the character recognizer 12, the matching result by the matching unit 16 normally indicates not-matching. Thus, in a case where a strikethrough is really provided in the input image, the recognition result R of the character recognizer 12 is not output as the final character recognition result.

In the method in the related art, in which the recognition result R of the character recognizer is rejected in a case where the strikethrough is detected, the method necessarily depends on the character recognition result by the person in a case where the strikethrough is detected. In this case, it is considered that the input itself of the person named "A" from the key input unit 14 is employed as the final character recognition result of the information processing apparatus. However, since the person often makes mistakes, in many cases, it is determined that reliability is not sufficient only by a recognition result of one person. Thus, in order to improve the reliability, it is considered that character recognition results of two or more persons match with each other, and the final character recognition result is obtained based on the result of the matching. However, engaging two or more persons increases the cost.

On the contrary, in the exemplary embodiment, in a case where the strikethrough is detected, the recognition result R of the character recognizer 12 is matched with the character recognition result of the person named "A". In a case where both the recognition results match with each other, the recognition result R is employed as the final recognition result. The final recognition result in this case is obtained by two independent recognition results matching with each other. Thus, reliability is higher than a case only using the character recognition result of the person named "A". As a result, in a case where the recognition result R of the character recognizer 12 matches with the character recognition result of the person named "A", the input of the second person is not necessary. Thus, required cost is reduced in comparison to a method of necessarily performing matching between inputs of two or more persons in a case where the strikethrough is detected.

Figure 4:
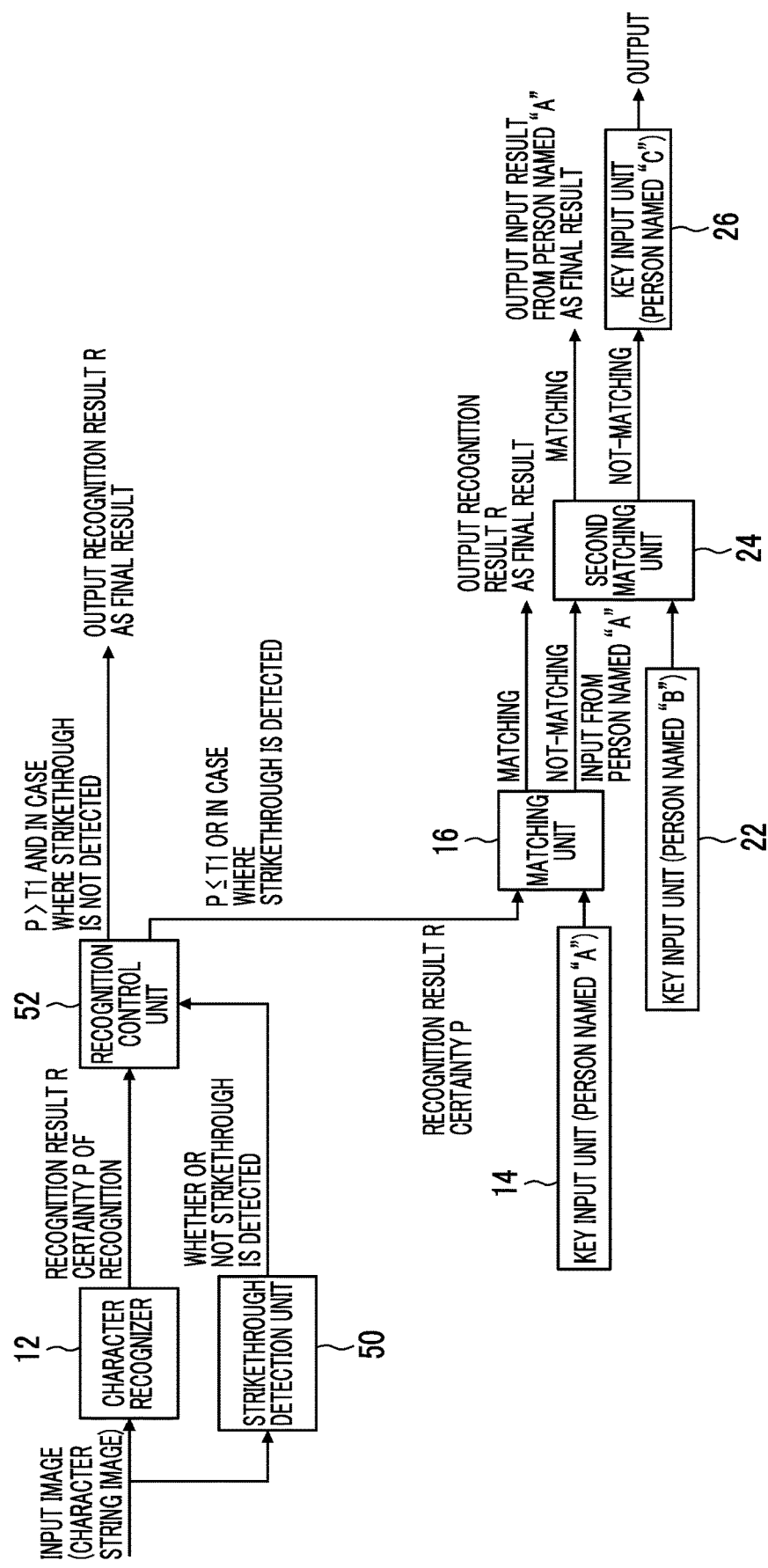
FIG. 4 is a diagram illustrating a configuration of processing in a case where a matching result of a matching unit indicates not-matching.

An example of a configuration of processing in a case where the matching result by the matching unit 16 indicates not-matching will be described with reference to FIG. 4. In FIG. 4, similar elements to those illustrated in FIG. 1 are denoted by the same reference signs, and descriptions thereof will not be repeated.

The information processing apparatus illustrated in FIG. 4 further includes a key input unit 22, a second matching unit 24, and a key input unit 26 in addition to the element group of the information processing apparatus illustrated in FIG. 1.

The key input unit 22 receives an input of a character recognition result of the input image from a person named "B", which is different from the person named "A". The second matching unit 24 matches the input of the person named "A", which is input from the matching unit 16, and the input of the person named "B", which is input from the key input unit 22. The key input unit 26 receives an input of a character recognition result of the input image from a person named "C", which is different from the person named "A" and the person named "B".

In the example in FIG. 4, in a case where a matching result of the recognition result R of the character recognizer 12 with the character recognition result of the person named "A" indicates not-matching, the matching unit 16 inputs the character recognition result of the person named "A" to the second matching unit 24. In this case, the key input unit 22 provides the input image to a terminal of the person named "B", and inputs the character recognition result which is input by the person named "B" in response to the providing, to the second matching unit 24. The second matching unit 24 matches the character recognition result of the person named "A" with the character recognition result of the person named "B". In a case where both the character recognition results match with each other, the second matching unit 24 outputs the matched character recognition result as the final character recognition result of the information processing apparatus. In a case where the result of the matching indicates not-matching, the second matching unit 24 operates the key input unit 26. The key input unit 26 provides the input image to a terminal of the person named "C", receives an input of the character recognition result from the person named "C" in response to the providing, and employs the character recognition result as the final character recognition result. Since a person who has a higher accuracy rate of the previously input character recognition result than those of the person named "A" and the person named "B" is employed as the person named "C", the accuracy of the final character recognition result is secured to some extent.

Figure 5:
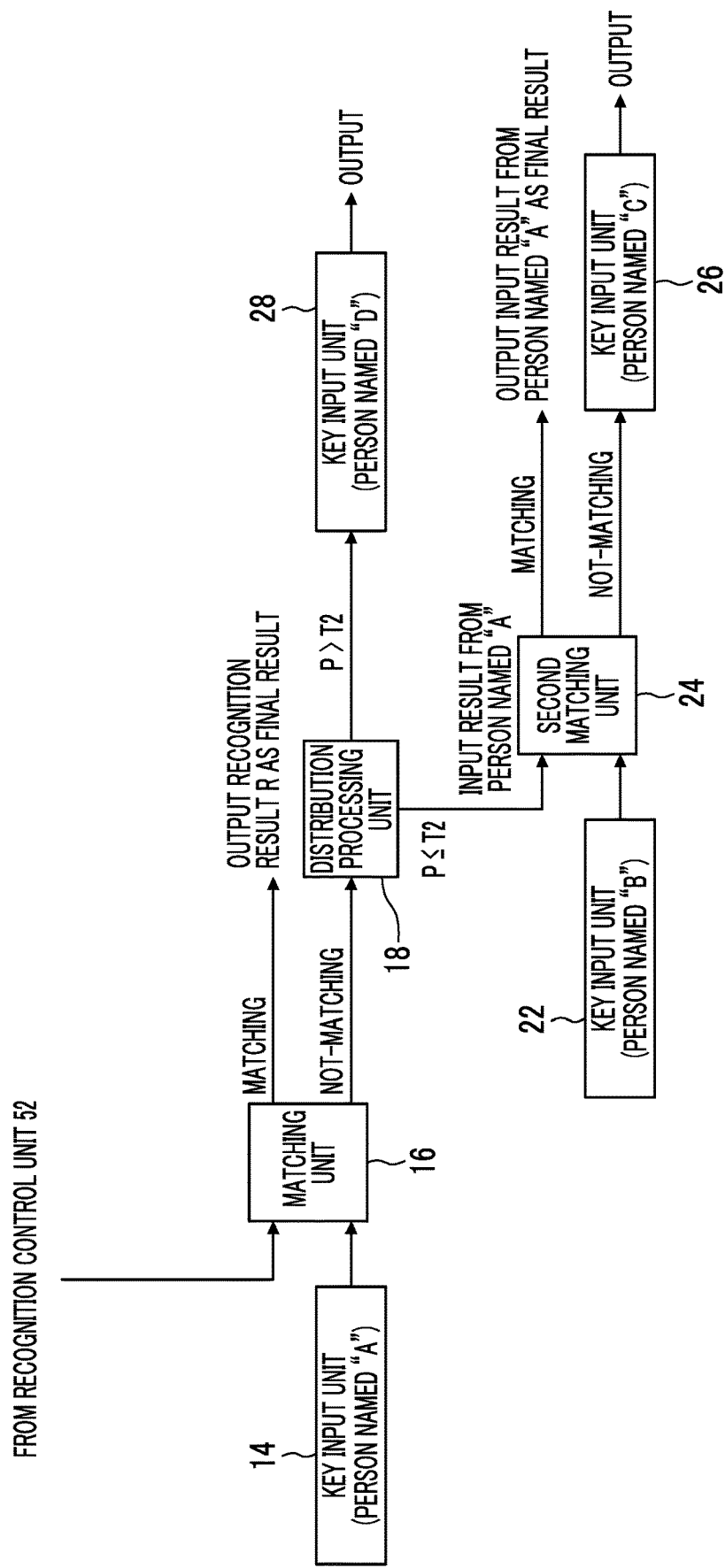
FIG. 5 is a diagram illustrating another configuration of the processing in a case where the matching result of the matching unit indicates not-matching.

Another example of the configuration of processing in a case where the matching result by the matching unit 16 indicates not-matching will be described with reference to FIG. 5. FIG. 5 illustrates components handling processing subsequent to matching processing by the matching unit 16 in the configuration of the information processing apparatus.

In the example in FIG. 5, in a case where the matching result by the matching unit 16 indicates not-matching, the matching unit 16 requests distribution of the processing by transferring an input image as a recognition target in this time, input data of the person named "A" on the input image, and the certainty P to a distribution processing unit 18.

In a case where the certainty P is greater than a preset threshold T2 (T2<T1), the distribution processing unit 18 transfers the input image to the key input unit 28. The key input unit 28 provides the input image to a pre-registered terminal of a person named "D", receives the character recognition result input by the person named "D" in response to the providing, and outputs the character recognition result as the final recognition result on the input image. Here, the person named "D" may be different from the person named "A".

In a case where the certainty P is equal to or smaller than the threshold T2, the distribution processing unit 18 transfers the input image to the key input unit 22 and transfers input data of the person named "A" to the second matching unit 24. The key input unit 22 provides the input image to the pre-registered terminal of the person named "B", receives the character recognition result input by the person named "B" in response to the providing, and transfers the character recognition result to the second matching unit 24. The second matching unit 24 matches the character recognition result of the person named "A" with the character recognition result of the person named "B". In a case where both the character recognition results match with each other, the second matching unit 24 outputs the matched character recognition result as the final character recognition result on the input image. In a case where both the character recognition results do not match with each other in matching of the second matching unit 24, the key input unit 26 provides the input image to the terminal of the person named "C" different from the person named "A" and the person named "B", receives the character recognition result input by the person named "C" in response to the providing, and outputs the character recognition result as the final recognition result.

Figure 6:
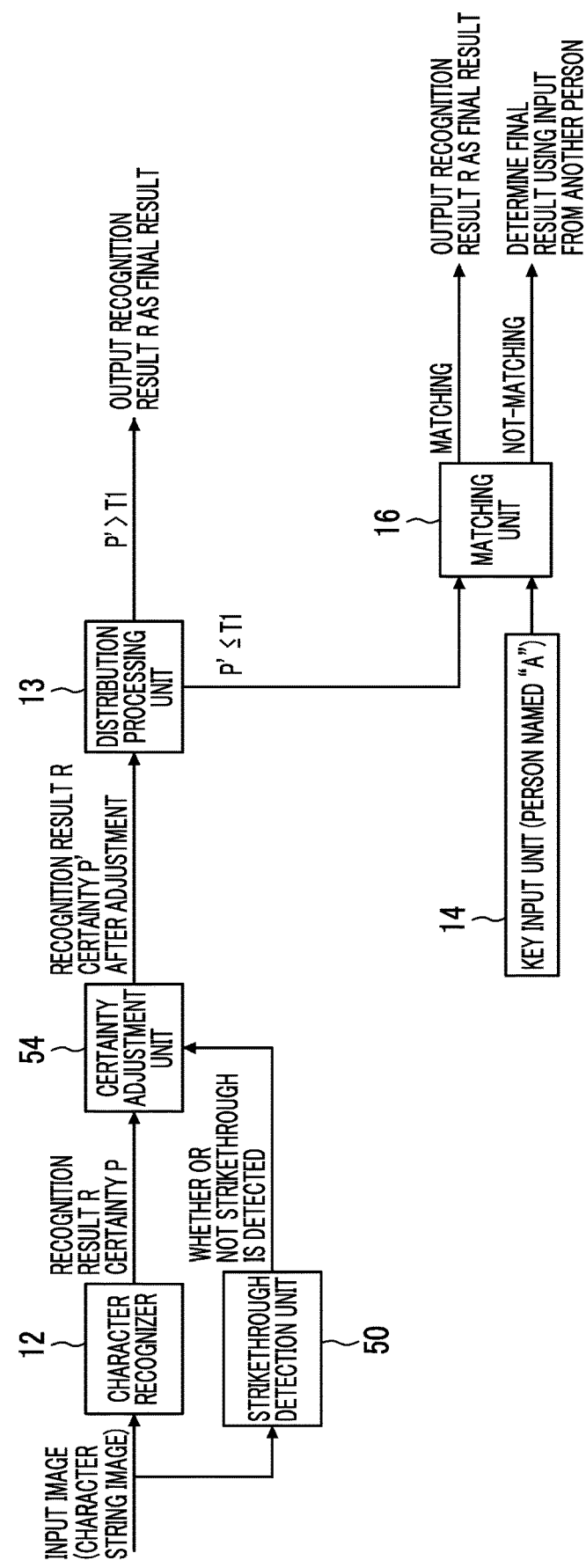
FIG. 6 is a diagram illustrating main components in a configuration of an apparatus in another example.

Another configuration of the information processing apparatus in the exemplary embodiment will be described with reference to FIG. 6. In FIG. 6, similar elements to those in the configuration in FIG. 1 are denoted by the same reference signs, and descriptions thereof will not be repeated.

The configuration in FIG. 6 is obtained by replacing the recognition control unit 52 in the configuration in FIG. 1 with a certainty adjustment unit 54 and a distribution processing unit 13.

The certainty adjustment unit 54 receives the recognition result R and the certainty P for an input image from the character recognizer 12, and information indicating whether or not a strikethrough is detected from the input image. The information is received from the strikethrough detection unit 50. In a case where the strikethrough is detected from the input image, the certainty adjustment unit 54 outputs the certainty P which is received from the character recognizer 12 and is adjusted to have a value smaller than the threshold T1, to the distribution processing unit 13. In a case where the strikethrough is not detected from the input image, the certainty adjustment unit 54 outputs the certainty P which is received from the character recognizer 12 and is not changed, to the distribution processing unit 13. The value of the certainty output by the certainty adjustment unit 54 is expressed by certainty P'. The certainty P' output by the certainty adjustment unit 54 is an example of "determination certainty".

The distribution processing unit 13 controls the subsequent processing path in accordance with the certainty P' input from the certainty adjustment unit 54. More specifically, in a case where the certainty P' is greater than the threshold T1, the distribution processing unit 13 outputs the recognition result R of the character recognizer 12 as the final character recognition result of the information processing apparatus. In a case where the certainty P' is equal to or smaller than the threshold T1, the distribution processing unit 13 outputs the recognition result R and the certainty P' to the matching unit 16. Processing performed by the matching unit 16 is similar to the configuration in a case of the exemplary embodiment in FIG. 1. The configuration illustrated in FIG. 4 or 5 may be employed as a processing configuration in a case where the matching result of the matching unit 16 indicates not-matching.

In a case where the strikethrough detection unit 50 and the certainty adjustment unit 54 are excluded from the configuration in FIG. 6, and an output of the character recognizer 12 is directly input to the distribution processing unit 13, a similar configuration to the configuration of the information processing apparatus in the related art, which is described above in the section of "DETAILED DESCRIPTION" is obtained.

The example in FIG. 6 realizes the function similar to the functions in the example in FIG. 1 by adding the strikethrough detection unit 50 and the certainty adjustment unit 54 without changing the function of each element of the configuration in the related art.

In one example, the above-described information processing apparatus in the exemplary embodiment may be configured in a form of a logic circuit of hardware. As another example, the information processing apparatus in the exemplary embodiment may be realized by causing a built-in computer to execute a program. The program represents each functional module in the system or the apparatus. Here, for example, the computer has a circuit configuration in which a processor such as a CPU, a memory (primary storage) such as a random access memory (RAM) and a read only memory (ROM), an HDD controller, various input and output (I/O) interfaces, and a network interface are connected to each other via a bus. The HDD controller controls a hard disk drive (HDD). The network interface performs control for connections with a network such as a local area network. A disk drive, a memory reader and writer and the like may be connected to the bus via the I/O interface. The disk drive is used for performing reading or writing from or in a portable disk recording media such as a CD and a DVD. The memory reader and writer is used for performing reading or writing from or in portable non-volatile recording media of various standards, such as a flash memory. The above-described program in which processing contents of each functional module are described is stored in a fixed storage device such as a hard disk drive via a recording medium such as a CD or a DVD or via a communication section such as a network, and then is installed on the computer. The above-described functional module group is realized in a manner that the program stored in the fixed storage device is read out to the RAM and is executed by the processor such as a CPU. The information processing apparatus in the embodiment may be configured by a combination of software and hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
perform character recognition of an input image to output a character recognition result;
receive an input of a character recognition result by a person on the input image;
detect a strikethrough from the input image;
matches the character recognition result with the character recognition result by the person; and
perform control for performing matching so as to obtain a final character recognition result based on a result of the matching, in a case where the strikethrough is detected.

2. The information processing apparatus according to claim 1,
wherein the processor further outputs certainty of the character recognition result, and
the processor
performs the control in a case where the certainty is smaller than a threshold, or the strikethrough is detected, and
sets the character recognition result as the final character recognition result without performing the control, in a case where the certainty is equal to or greater than the threshold, and the strikethrough is not detected.

3. The information processing apparatus according to claim 1,
wherein the processor further outputs certainty of the character recognition result, and
the processor
employs the certainty as determination certainty in a case where the strikethrough is not detected,
changes the certainty to have a value smaller than a threshold and employs the changed certainty as the determination certainty, in a case where the strikethrough is detected,
performs the control in a case where the determination certainty is equal to or smaller than the threshold, and
sets the character recognition result as the final character recognition result without performing the control, in a case where the determination certainty is greater than the threshold.

4. A non-transitory computer readable medium storing a program causing a computer to function as:
- a character recognition section that performs character recognition of an input image to output a character recognition result;
- a receiving section that receives an input of a character recognition result by a person on the input image;
- a detection section that detects a strikethrough from the input image;
- a matching section that matches the character recognition result output by the character recognition section with the character recognition result by the person, which is received by the receiving section; and
- a control section that performs control for causing the matching section to perform matching so as to obtain a final character recognition result based on a result of the matching, in a case where the detection section detects the strikethrough.

5. An information processing apparatus comprising:
- character recognition means for performing character recognition of an input image to output a character recognition result;
- receiving means for receiving an input of a character recognition result by a person on the input image;
- detection means for detecting a strikethrough from the input image;
- matching means for matching the character recognition result output by the character recognition means with the character recognition result by the person, which is received by the receiving means; and
- control means for performing control for causing the matching means to perform matching so as to obtain a final character recognition result based on a result of the matching, in a case where the detection means detects the strikethrough.

* * * * *